United States Patent Office 3,141,729
Patented July 21, 1964

3,141,729
GELS AND METHOD OF MAKING
Richard G. Clarke, Hartford, Richard H. Groth, South Windham, and Edward J. Duzak, Hartford, Conn., assignors to United Aircraft Corporation, Hartford, Conn., a corporation of Delaware
No Drawing. Filed July 11, 1960, Ser. No. 41,801
8 Claims. (Cl. 23—4)

The present invention relates to cogels and to a method for making. More particularly the present invention relates to cogels of a divalent and a trivalent metal and to a method of making wherein carbon dioxide gas is evolved and to a process for adsorbing carbon dioxide and water which may be freed of said carbon dioxide and water with the input of a minimum of energy.

The prior methods used for the removal of carbon dioxide from an atmosphere usually have involved the use of washing the carbon dioxide containing atmosphere with caustic solutions which would result in the precipitation of metallic carbonates. Such solutions are quite easily made, relatively inexpensive and efficient in operation. These systems are quite inexpensive to operate and the metallic carbonates formed usually were consumed in by-product uses or simply discarded as waste.

Where availability of reagents, energy sources and space in which to carry on the treatment of carbon dioxide containing atmospheres are not limited for practical purposes, conventional systems have proved satisfactory. The problem facing a voyager in space is that of removing the noxious byproducts of respiration such as carbon dioxide by such means that the minimum of space in the spaceship vehicle is taken up and that it be such a means that it be regenerable with a minimum input of energy and over a great number of cycles. The best mode of such regeneration would be to utilize the vacuum existing in interplanetary space to remove the carbon dioxide scavenged from the atmosphere within the space vehicle or to use such heat as is generated within the vehicle as may be surplus and excessive by its encounters with the random matter in space or such other heat as may be advantageously dissipated from the spaceship. This is the primary object of the present invention but an analogous use in undersea craft can be readily envisioned.

The present invention has as its object the provision of a means for removing carbon dioxide and water from an environmental atmosphere, said means being readily regenerated by drawing a vacuum thereon, supplying heat thereto or by using a combination of these two means.

According to one embodiment of the present invention, a regenerable adsorbent for carbon dioxide gas has been made which comprises the metal oxide of a trivalent metal, the mole percent ratio of the one metal to the other being in the range of from 10 to 70 and 90 to 30 percent, respectively, and which has been prepared by precipitation from a carbonate solution.

According to another embodiment of the present invention, a method for the preparation of a regenerable adsorbent for carbon dioxide has been discovered which comprises preparing an aqueous solution of carbonate ions, and adding thereto less than the stoichiometric amount of the combination of a salt of a divalent metal and the salt of a trivalent metal wherein the metals are in a mole percent ratio in the range of from 10 to 70 and 90 to 30.

According to still a further embodiment of the present invention, the process for purifying atmospheres containing carbon dioxide and water has been discovered which comprises passing said atmospheres into contact with the adsorbents described herein, regenerating the adsorbents by desorbing the adsorbed carbon dioxide and water by applying at least one of the desorbing means, heat and a vacuum, venting the desorbed material into another atmosphere and reintroducing the atmosphere to be cleaned into contact with the regenerated adsorbents.

The means to accomplish these objects are cogels which comprise the combination of a divalent metal oxide with a trivalent metal oxide. The ratio of the one to the other in some of the most efficient cogels has been found to approximate that of the spinels but this ratio may be varied greatly without losing the advantages of the present invention. This permits the production of gels from the most available metals thereby minimizing the expense.

The gels of the present invention are formed most advantageously by reacting a solution of the nitrates or chlorides of one or more metals in the bivalent condition and one or more metals in a state of tervalence with a solution of ammonium or an alkali metal carbonate. The gel is precipitated at room temperature. During the gel formation stage there is evolved carbon dioxide gas. Applicants do not wish to be restricted to the following explanation but it appears that the evolution of carbon dioxide during the gel forming period results in particularly efficient carbon dioxide adsorption after the gel has been dried and calcined. After the gel has set, it is washed with water to free it of dissolved salts, dried at 100° and may be baked at 300° to 600° C. Gels that successfully adsorb carbon dioxide have been prepared using the bivalent metals zinc, iron, nickel, copper, cobalt, manganese, magnesium, calcium, barium, and cadmium, or mixtures thereof. The tervalent metals used in successful preparations are aluminum, iron, and chromium, or mixtures thereof. Although it is univalent, the properties of the compounds of lithium more nearly resemble those of a bivalent metal of the alkaline earth group than of the alkali metal group to which it formally belongs. This effect is fully explained in standard treatises of inorganic chemistry. As might be expected, lithium behaves as a bivalent metal in our gels, and forms an effective carbon dioxide adsorbing composition. These gels may be made integrally, i.e., they may be a combination of metals coprecipitated as a single gel. Where insufficient surface has been found to exist in the gel itself the gels may be supported on asbestos, or other high surface support material. Pellets of the gels have been prepared and found useful for some purposes. The gel is pelleted without binder before it is dried at 100° C. A press mold lubricant, such as graphite, may be incorporated in amount up to 1% by weight with no loss of absorptivity.

The general results following from these embodiments indicate, as a general rule, that in the gels prepared with such compounds and under such process conditions, the greater the amount of carbon dioxide evolved during the gel forming stage, the more efficient are the gels as carbon dioxide adsorbents. It has further been noted that the gel bodies do not lose their ability to adsorb carbon dioxide although they pick up a considerable portion of their weight in water. It has been found, to the contrary, that gel bodies prepared in the manner of the present invention are in fact more efficient carbon dioxide adsorbents when they contain water than when they are dry. This is particularly desirable where they are used to remove carbon dioxide from air which is breathed by animals, since in addition to carbon dioxide, water is also produced as a result of metabolism.

The following specific examples are given to demonstrate the various factors affecting the production of suitable gels for the purposes of the present invention and are set forth by way of explanation and not of limitation.

The cogels of the present invention are preferably formed by coprecipitation. The nitrate salts of the divalent and trivalent metals are added to an aqueous solution of an approximately stoichiometric amount of an alkali metal carbonate or ammonium carbonate. The cogel precipitates and is filtered, and washed with clean water to free it from impurities. The gel is formed at room temperature with the evolution of carbon dioxide gas. The clean gel is dried at about 100° C. and may then be calcined at 300° to 600° C. depending upon its ability to stand the temperature. Calcining is permissive. A few elements, through unique individual characteristics, flow like water at elevated temperature in the presence of traces of water vapor. Iron has this property, so iron gels must not be calcined.

A preferred cogel was formed as follows: 3000 grams $K_2CO_3$ was dissolved in 10 liters of water at room temperature. The solution was constantly stirred while a total of 1230 grams $Mg(NO_3)_2 \cdot 2H_2O$ and 1250 grams of $Al(NO_3)_3 \cdot 9H_2O$ dissolved in another 10 liters of water are added. A gel of $MgO \cdot Al_2O_3$ co-precipitates with the evolution of $CO_2$ gas. The fluid cogel is filtered in a press to remove insoluble impurities and the filtrate washed to remove any soluble salts taken down by it. The clean gel is dried to a constant weight at 100° C. It is then calcined to a constant weight at 450° C.

In preparing the new and novel adsorbents of the present invention, the precipitation solutions are preferably maintained at as low a temperature as is consonant with proper carbon dioxide evolution, i.e., a temperature suitable to cause carbon dioxide evolution to occur and to progress to completion. Also, the metal salt solution should be added to the carbonate gradually with mechanical stirring. It has been discovered that too fast a rate of addition of the metal salt solution produces inferior products. The quantity of carbonate may vary between about 0 and 10 percent or higher in excess of the stoichiometric quantity required to react with the metal salt. Preferably, the quantity of carbonate is about 3 to 7 percent in excess of stoichiometric requirements. Particularly good results are achieved when the carbonate is present in approximately 5 percent excess of theoretical.

Care should be taken to insure washing of the gel precipitate by water following precipitation. Thus, a second washing has been found to improve the adsorption characteristics of the gel by as much as 10 percent. The washing should be carried out soon after precipitation. Once the gel is set and dried, washing will not improve its characteristics.

This cogel was exposed to $CO_2$ gas at 1 atmosphere pressure for 30 minutes. It was then desorbed for 30 minutes and 90 minutes, respectively, by placing it in 110° C. drying ovens. Adsorption and desorption is reported in terms of square meters per gram of adsorbent.

Table I

| Gel | Mole Percent Ratio of Metals | Adsorption | Desorption 30' | Desorption 90' |
| --- | --- | --- | --- | --- |
| $MgO \cdot Al_2O_3$ | 65:35 | 140 | 56 | |

Other gels similarly made are reported on the same basis:

| | | | | |
| --- | --- | --- | --- | --- |
| $ZnO \cdot Al_2O_3$ | 65:35 | 72 | 50 | 53 |
| $ZnO \cdot Al_2O_3$ | 78:22 | 87 | 74 | 66 |
| $MgO \cdot Al_2O_3$ | 62:38 | 114 | 45 | |

The gels of the present invention may be supported. Conventional methods, well known in the catalyst art may be used to obtain supported gels. The support may be formed first and the active gel or cogel introduced on to it by precipitation. Several suitable methods are described in the U.S. patent to Nahiu No. 2,487,466, issued November 8, 1949. Cogels of zinc and aluminum and of magnesium and aluminum were coprecipitated on finely divided asbestos from an aqueous $(NH_4)_2CO_3$ solution.

Comparative results with supported and non-supported gels are given below.

Table II

| Gel | Mole Percent Ratio | Adsorption | Desorption | |
| --- | --- | --- | --- | --- |
| | | | 30' | 90' |
| $MgO \cdot Al_2O_3$ (same on asbestos) | 67:33 | 171 | 97 | 103 |
| | | 114 | 78 | 89 |
| $MgO \cdot Al_2O_3$ (same on asbestos) | 61.5:38.5 | 25 | 0 | |
| | | 50 | 0 | |
| $ZnO \cdot Al_2O_3$ (same on asbestos) | 80:20 | 30 | 4 | |
| | | 60 | 36 | |
| $ZnO \cdot Al_2O_3$ (same on asbestos) | 60:40 | 50 | 1 | |
| | | 67 | 36 | |

The results described above show the ability to adsorb and desorb $CO_2$ varies considerably from gel to gel both as the gels relate to the metals from which they are formed and the mole ratio of one metal to the other. A surprising result of the present invention is the preparation of a gel which is capable not only of efficiently adsorbing $CO_2$ from an atmosphere but being further capable of releasing the adsorbed $CO_2$ with ease and efficiency.

Another surprising feature of the present invention is the continued effectiveness of the gels even when loaded with moisture. Several samples are described below where comparison is made between dry gels and those containing 50% of water necessary to saturate them. The gels were prepared by precipitation from $K_2CO_3$ solutions. After the washing step the gels were further treated with ethyl alcohol, acetone or other dessicating solution to insure dryness.

The gels set forth in Table III were all made up to give a cogel with a ratio of divalent to trivalent metal in accordance with the molecular formula $MO \cdot M_2O_3$. The bivalent and tervalent metals may be the same or different metals.

The properties of the gels relating to $CO_2$ and water content are set forth in the table below.

Table III

| Gel | Equilibrium Rel. Humidity [1] | Adsorption, m²/g. | Desorption in vacuo, 4 mm. Hg Percent $CO_2$ (30'), m²/g. |
| --- | --- | --- | --- |
| $CuO \cdot Fe_2O_3$ | 50 | 140 | 50 |
| $CuO \cdot Fe_2O_3$ | 0 | 87 | 44 |
| $FeO \cdot Fe_2O_3$ | 50 | 120 | 25 |
| $FeO \cdot Fe_2O_3$ | 0 | 105 | 47 |
| $MgO \cdot Fe_2O_3$ | 50 | 38 | 3 |
| $MgO \cdot Fe_2O_3$ | 0 | 51 | 40 |
| $ZnO \cdot Fe_2O_3$ | 50 | 120 | 25 |
| $ZnO \cdot Fe_2O_3$ | 0 | 77 | 38 |
| $CuO \cdot Al_2O_3$ | 50 | 65 | 20 |
| $CuO \cdot Al_2O_3$ | 0 | 50 | 46 |
| $FeO \cdot Al_2O_3$ | 50 | 140 | 17 |
| $FeO \cdot Al_2O_3$ | 0 | 56 | 34 |
| $MgO \cdot Al_2O_3$ | 50 | 340 | 10 |
| $MgO \cdot Al_2O_3$ | 0 | 66 | 18 |
| $ZnO \cdot Al_2O_3$ | 50 | 145 | 19 |
| $ZnO \cdot Al_2O_3$ | 0 | 63 | 24 |

[1] 50 Equilibrium Relative Humidity in column 2 refers to the preparation of the gel for test by allowing it to adsorb water vapor until it is in equilibrium with an atmosphere of 50 R.H. at approximately 25° C.

The optimum gel for the present purpose of treating confined atmospheres to remove $CO_2$ is one which not only takes up large amounts of that gas but which may be readily regenerated in order that it may be used again and again.

The invention in its broader aspects is not limited to the specific steps, methods, compositions, combination and improvements described but departures may be made therefrom within the scope of the accompanying claims without departing from the principles of the invention and without sacrificing its chief advantages.

What is claimed is:

1. A regenerable adsorbent for carbon dioxide gas having the property of being able to readily adsorb and desorb carbon dioxide which comprises a cogel of metal oxides of a first metal selected from the group consisting of lithium and the divalent metals zinc, iron, nickel, copper, cobalt, manganese, magnesium, calcium, barium, and cadmium, including mixtures of the foregoing, and a second metal selected from the group consisting of the tervalent metals aluminum, iron, chromium, including mixtures of the foregoing, the mole percent ratio of one of said metals to the other metal being in the range of from about 10 to 70 and 90 to 30 percent, respectively, and which has been prepared by co-precipitation from a solution comprising a carbonate which is a member selected from the group consisting of alkali metal carbonate and ammonium carbonate, followed by drying.

2. A regenerable adsorbent as set forth in claim 1 wherein carbon dioxide gas is liberated during its precipitation.

3. A regenerable adsorbent as set forth in claim 1 wherein it is supported on a support.

4. A regenerable adsorbent as set forth in claim 1 wherein the mole ratio is in the range of from 30 to 70 percent and 70 to 30 percent.

5. A method for the preparation of a regenerable adsorbent for carbon dioxide which comprises preparing an aqueous solution of a carbonate which is a member selected from the group consisting of alkali metal carbonates and ammonium carbonate, adding thereto less than the stoichiometric amount of the combination of a salt of a first metal selected from the group consisting of lithium and the divalent metals zinc, iron, nickel, copper, cobalt, manganese, magnesium, calcium, barium, and cadmium, including mixtures of the foregoing, and the salt of a second metal selected from the group consisting of the tervalent metals aluminum, iron, chromium, including mixtures thereof, the mole percent ratio of one of said metals to the other metal being in the range of from 10 to 70 and 90 to 30, keeping the solution at about room temperature, removing the precipitated gel from impurities, washing the gel, drying the gel and calcining the gel.

6. The method of claim 5 wherein the gel is dried at a temperature in the range of from 100° to 120° C. and is calcined at a temperature of 300° to 600° C.

7. A method for the preparation of a regenerable adsorbent for carbon dioxide which comprises preparing an aqueous solution of a carbonate which is a member selected from the group consisting of alkali metal carbonates and ammonium carbonate, adding thereto less than the stoichiometric amount of the combination of a salt of a first metal selected from the group consisting of lithium and the divalent metals zinc, iron, nickel, copper, cobalt, manganese, magnesium, calcium, barium, and cadmium, including mixtures of the foregoing, and the salt of a second metal selected from the group consisting of the tervalent metals aluminum, iron, chromium, including mixtures thereof, the mole percent ratio of one of said metals to the other metal being in the range of from 10 to 70 and 90 to 30, keeping the solution at about room temperature, removing the precipitated gel from impurities, washing the gel, and drying the gel.

8. A process for purifying atmospheres containing carbon dioxide and water which comprises passing said atmosphere into contact with adsorbents made in accordance with claim 7, regenerating the adsorbents by desorbing the adsorbed carbon dioxide and water by applying at least one of the desorbing means, heat and a vacuum, venting the desorbed material into another atmosphere and reintroducing the atmosphere to be cleaned into contact with the regenerated adsorbents.

References Cited in the file of this patent

UNITED STATES PATENTS

| | | |
|---|---|---|
| 1,345,323 | Frazer et al. | June 29, 1920 |
| 2,794,053 | Altreuter et al. | May 28, 1957 |
| 2,822,336 | Polack | Feb. 4, 1958 |
| 2,992,703 | Vasan et al. | July 18, 1961 |

FOREIGN PATENTS

| | | |
|---|---|---|
| 777,233 | Great Britain | June 19, 1957 |